United States Patent
Kugitani et al.

(10) Patent No.: US 7,588,792 B2
(45) Date of Patent: Sep. 15, 2009

(54) PRODUCTION OF EXTRUDED EDIBLE MATERIAL

(75) Inventors: Hirofumi Kugitani, Izumisano (JP); Yasuyuki Nakano, Izumisano (JP); Nozomi Harada, Izumisano (JP); Yasuo Ohtani, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 630 days.

(21) Appl. No.: 11/346,384

(22) Filed: Feb. 3, 2006

(65) Prior Publication Data

US 2006/0127552 A1    Jun. 15, 2006

Related U.S. Application Data

(62) Division of application No. 10/948,278, filed on Sep. 24, 2004, now abandoned.

(30) Foreign Application Priority Data

Sep. 30, 2003   (JP)   ............................. 2003-338987

(51) Int. Cl.
    *A23L 1/20*   (2006.01)

(52) U.S. Cl. .................. 426/634; 426/656; 426/615
(58) Field of Classification Search ................. 426/634, 426/656, 615
    See application file for complete search history.

(56) References Cited

U.S. PATENT DOCUMENTS

| 2,346,232 | A | 4/1944 | Piret et al. |
| 3,093,488 | A | 6/1963 | Graham et al. |
| 6,653,451 | B1 * | 11/2003 | Kerr et al. ................... 530/378 |

FOREIGN PATENT DOCUMENTS

| CN | 1097289 | 1/1995 |
| JP | 57138355 | 8/1982 |

* cited by examiner

*Primary Examiner*—Anthony Weier
(74) *Attorney, Agent, or Firm*—Wenderoth, Lind & Ponack, L.L.P.

(57) ABSTRACT

An extruded edible material having soybean protein and cabbage, wherein the content of cabbage is 0.05 to 8 parts by weight (as dry solids content) per 100 parts by weight of the soybean protein (as dry solids). In the extruded edible material, a peculiar flavor derived from soybean protein is improved.

4 Claims, No Drawings

PRODUCTION OF EXTRUDED EDIBLE MATERIAL

This application is a Divisional application of Ser. No. 10/948,278, filed Sep. 24, 2004 now abandoned.

BACKGROUND OF THE INVENTION

1. Field of the Invention

The present invention relates to an extruded edible material to be used for processed food which is excellent in a flavor and a process for producing thereof.

2. Background of the Invention

Conventionally, soybean protein has been utilized in food in various forms on the basis of its physical functions (gel forming property, emulsification property, water retention property, mouthfeel improving property, etc.), its nutritious functions and the like.

For giving tastiness to food, there can be roughly classified into the case where tastiness of a raw material itself is well drawn and utilized, and the case where a raw material is finished as tasteless and odorless as possible and then the resulting product is desirably seasoned. Regarding soybean protein, typical examples of the former case include soybean flour and soybean milk, and typical examples of the latter case include isolated soybean protein and granulated soybean protein to be used in ham, sausage, fishery paste products, daily dishes, and the like.

The present invention relates to an extruded edible material to be used for processed food which is excellent in flavor and a process for production thereof.

Then, attempts have been made heretofore to solve such problems. For example, JP 64-086840 A discloses the use of an oil containing flavor components of vegetables, and JP 13-327253 A discloses the used of both animal and vegetable extracts in combination.

In the latter case, since soybean protein has a peculiar flavor derived from a raw material (soybeans), when soybean protein is used for the production of processed food, there is a problem that an amount thereof to be used is organoleptically restricted. In particular, in a textured product (one of extruded food) obtained by extruding soybean protein having a relatively low purification degree, a peculiar flavor derived from a raw material is apt to be recognized in the resulting product. This is problematic because, even when it is desired to use a large amount of soybean protein in the production of food, it cannot be blended in a large amount from a viewpoint of flavor.

Then, attempts have been made heretofore to solve such problems. For example, JP 64-086840 A discloses the use of an oil containing flavor components of vegetables, and JP 13-327253 A discloses the use of both animal and vegetable extracts in combination.

Then, it is desired to develop a technique to improve a flavor of soybean protein by so-called masking with light seasoning wherein food using soybean protein can be desirably seasoned afterward, rather than positive seasoning.

Meanwhile, it is well known that vegetables are used in cooked-processed food such as a hamburger, etc., and cabbage is used as one of vegetables in some cases, but is used not for the purpose of improving a flavor of such cooked food, but is usually used as one of raw materials of food.

An extruded edible material to be used for producing processed food is known to be a material produced by using an extruding machine (so-called extruder) as described in "Extrusion Cooking (Development and Utilization of Twin-Screw Type)" by Extrusion Cooking Technology Development Association in Food Industry, published by Korin Publishing Co., Ltd. However, use of cabbage in such an extruded edible material for masking a peculiar flavor possessed by soybean protein is not disclosed.

SUMMARY OF THE INVENTION

Under the above circumstances, one object of the present invention is to improve a peculiar flavor of soybean protein derived from a raw material in an extruded edible material obtained by mixing soybean protein and water, and extruding the mixture with heating under pressure. The other objects and advantages of the present invention will become apparent to those skilled in the art from the following description.

The present inventors have studied masking of a peculiar flavor of soybean protein in an extruded edible material obtained by mixing soybean protein and water, and extruding the mixture with heating under pressure intensively by focusing on vegetables as a masking ingredient. As a result, they have found that, by adding cabbage among many vegetables, a peculiar flavor of soybean protein derived from a raw material can be specifically masked without influence of flavors of vegetables. Thus, the present invention has been completed.

That is, the present invention provides an extruded edible material comprising soybean protein and cabbage, wherein the content of cabbage is 0.05 to 8 parts by weight (as dry solids content) per 100 parts by weight of the soybean protein (as dry solids).

Preferably, in the extruded edible material of the present invention, the soybean protein is isolated soy protein, and the content of cabbage is 0.05 to 3 parts by weight (as dry solids) per 100 parts by weight of the soybean protein (as dry solids).

In another aspect of the extruded edible material of the present invention, the soybean protein is defatted soybeans and the content of cabbage is 0.5 to 8 parts by weight (as dry solids) per 100 parts by weight of the soybean protein (as dry solids).

Further, the present invention provides a process for producing an extruded edible material which comprises mixing soybean protein, cabbage and water, and extruding the mixture with heating under pressure.

Preferably, in the process of the present invention, the content of cabbage is 0.05 to 8 parts by weight (as dry solids) per 100 parts by weight of the soybean protein (as dry solids).

DETAILED DESCRIPTION OF THE PREFERRED EMBODIMENTS

Extruded Edible Material

The term "extruded edible material" used herein refers to an edible material to be used for producing processed food which is produced by using an extruding machine (extruder) as mentioned above. In other words, the extruded edible material is a so-called extrusion-cooked edible material obtained by extruding a mixture of ingredients with an extruder with heating under pressure. More specifically, it is an extruded edible material obtained by mixing soybean protein, cabbage and water, and extruding the mixture by using an extruder with heating under pressure.

In the present invention, the extruded edible material comprises as essential ingredients soybean protein and cabbage, wherein 0.05 to 8 parts by weight of cabbage (as dry solids) is contained per 100 parts by weight of soybean protein (as dry solids).

When the mixture of ingredients contains a relatively higher amount of starch as compared with soybean protein, the edible material is suitable for producing snacks, cereals, noodles, etc. On the other hand, when the content of soybean protein is higher in the mixture of ingredients, the edible material is suitable for producing textured protein, fibrous protein, etc.

(Soybean Protein)

As soybean protein, whole soybeans, fat-reduced soybeans, defatted soybeans, soybean milk, "okara (soy pulp)", isolated soy protein, soybean peptide, soybean globulin, soybean albumin, etc. can be utilized in the present invention. Preferably, in the present invention, defatted soybeans or isolated soybean protein is used as soybean protein.

In addition to soybean protein, other ingredients, for example, materials derived from animals, vegetables, microorganisms, and other food and food ingredients derived therefrom can be used in the extrusion processing of the present invention.

(Cabbage)

Cabbage is a cruciferous biennial plant, and is characterized in that it contains relatively large amounts of calcium, potassium and edible fiber.

In the present invention, cabbage, dried cabbage, and an extract of cabbage can be utilized, and dried cabbage is preferred from a view point of industrial production.

In the present invention, the mode of addition of cabbage is not specifically limited, and fresh cabbage, its juice, dried cabbage, its powder, a concentrate of juice, etc. may be added. A powder of dried cabbage is preferably used because weighing and mixing are easy.

(Amount of Cabbage to be Added)

Although an amount of soybean protein contained in the mixture of ingredients of the extruded edible material is not specifically limited, an amount of cabbage relative to soybean protein is defined. When the amount of cabbage relative to soybean protein is too small, masking effect becomes insufficient. On the other hand, when the amount is too large, masking effect is sufficient, but a strong flavor of cabbage is caused and this is undesirable except that a strong flavor of cabbage is not problematic, or is required.

That is, the sufficient masking effect is obtained when 0.05 part by weight or more of cabbage (as dry solids) is used per 100 parts by weight of soybean protein (as dry solid) in the mixture of ingredients of the extruded edible material. On the other hand, when the amount of cabbage is 8 parts by weight or more, the sufficient masking effect is obtained, but a cabbage flavor becomes too strong. This is not desirable.

Specifically, intensity of a peculiar flavor derived from a raw material of soybean protein varies depending on a particular kind of soybean protein, and the proper range of the amount of cabbage to be added can be experimentally determined in the range of 0.05 to 8 parts by weight of cabbage (as dry solids) per 100 parts by weight of soybean protein (as dry solids).

For example, since purified soybean protein such as isolated soybean protein has a less peculiar flavor derived from soybeans, when 0.05 part by weight or more of cabbage (as dry solids) is used per 100 parts by weight of soybean protein (as dry solids), a flavor is sufficiently improved. Conversely, when the amount of cabbage exceeds 4 parts by weight per 100 parts by weight of soybean protein, a flavor of cabbage is remarkably recognized. Therefore, a preferable range of the amount of cabbage (as dry solids) to be added is 0.05 to 3 parts by weight, more preferably 0.3 to 0.6 part by weight per 100 parts by weight of soybean protein (as dry solids).

Further, for example, soybean protein having a relatively low purification degree such as defatted soybeans has a much higher peculiar flavor derived from soybeans. Therefore, when 0.5 part by weight or more of cabbage (as dry solids) is used per 100 parts by weight of soybean protein (as dry solids), a flavor is sufficiently improved. Conversely, when the amount of cabbage exceeds 8 parts by weight per 100 parts by weight of soybean protein, a flavor of cabbage is remarkably recognized. Therefore, a preferable range of the amount of cabbage (as dry solids) to be added is 0.5 to 8 parts by weight, more preferably 2 to 4 parts by weight per 100 parts by weight of soybean protein (as dry solids).

When cabbage to be used is in the form of other than dried cabbage, its amount can be calculated in terms of dried cabbage. The optimal range can be determined experimentally.

In the present invention, as shown in Examples hereinafter, many vegetables were compared and studied, but a vegetable which remarkably improved only a flavor of soybean protein without influence of flavors of vegetables was only cabbage. This mechanism has not been elucidated yet.

(Production Steps)

The present invention relates to an extruded edible material produced by using an extruding machine. An extruding machine is widely known as a so-called extruder, and can produce various kinds of edible materials depending upon the shape and number of screws of an extruder, heating and pressure conditions, the shape of a die, etc. (see the above "Extrusion Cooking (Development and Utilization of Twin-Screw Type)", by Extrusion Cooking Technology Development Association in Food Industry, published by Korin Publishing Co., Ltd.)

The extruded edible material of the present invention can be produced by charging a mixture of ingredients into an extruding machine, feeding the mixture with screw(s) under pressure, if necessary, by heating or cooling a barrel, and extruding the mixture through a die attached to an outlet under pressure with adjusting pressure conditions in the interior of a cylinder.

An amount of water in the mixture of ingredients, a barrel temperature, heating and pressure conditions can be appropriately selected depending on the desired extruded material.

For example, in the case of producing a textured protein material of soybean protein, the following conditions are suitable:

It is desirable to use a twin or more-screw type extruding machine which is suitable for strong kneading and forming texture. An extruding machine may have a jacket, or may not have it. Although heating or cooling with a barrel is carried out at manufacturer's discretion, an extruding machine having a barrel which can control a temperature is more suitable. As a screw, in addition to a forward screw having feeding function, another screw having kneading function such as a cut screw, a reverse cut screw, a kneading screw, a reverse kneading screw, a paddle screw, etc. can be set up. If necessary, a reverse screw, a spacer, a steam lock, etc. may be set up. When screws having kneading function are concentrated in a heating part near a tip, or a long period of kneading time is taken, kneading generally becomes strong, and a mixture of ingredients is easily melted. This is desired.

In addition, conditions for forming texture can be experimentally determined depending upon the desired quality. For example, a texture forming temperature as a tip barrel temperature is suitably 120 to 200° C., preferably 140 to 180° C. When the tip barrel temperature is lower than 120° C., a large part of the mixture of ingredients remains without melting and the mixture is hardly expanded. This is not desirable. When the temperature is lower than 140° C., the mixture is melted to some extent, while expansion is insufficient. This is not desirable, either. On the other hand, when the tip barrel temperature is higher than 200° C., the mixture is sufficiently melted and expanded, but scorching occurs. This is not desirable. When the temperature is higher than 180° C., the mixture is sufficiently melted and expanded, but a slight scorching odor is generated. This is not desirable, either.

As a die, a known one such as a die which extrudes a material in a screw direction (so-called face die), a die which extrudes a material in an outer circumferential direction of feeding (peripheral die), etc. can be used. The area of an opening of a die hole, the shape of a die hole, the number of a die hole, the length of a land of a die, heating or cooling of a die, and the presence or the absence of a breaker plate, etc. can be selected depending upon a particular purpose.

The amount of water or steam to be added can be selected in such a range that water contained in the mixture of ingredients including water in ingredients and added water which are fed to an extruding machine becomes 7 to 50% by weight, preferably 20 to 40% by weight. Depending upon a formulation of ingredients, when the water content is less than 7% by weight, sufficient water for melting the ingredients is not present, which results in a powdery or granular extrudate. Such an extrudate is not textured or expanded, and is not desirable. Although, when the water content is less than 20% by weight, a sufficiently expanded extrudate is obtained in the case that the extruded edible material is snacks having a less soybean protein content and containing a large amount of starch, such water content is not desirable because, sometimes, it causes insufficient melting to form a powdery or granular extrudate which cannot be textured or expanded sufficiently in the case that the extruded edible material is a meat-like material having a high soybean protein content.

When the water content is higher than 50% by weight, depending on an amount of a fat or oil ingredient contained in the mixture of ingredients, an extrudate is hardly expanded and this is not desirable. When the water content is higher than 40% by weight, sometimes, expansion is insufficient.

The extruded edible material thus obtained can be cut into a suitable size with a cutter or a grinder, and this can be utilized for the production of processed food. For example, when the material is cut finely and mixed with other edible ingredients, the material can exert the functions to provide meat-like mouthfeel to processed food, to improve a yield of processed food, to provide juicy feeling to processed food, to maintaining seasoning, and the like. In addition, even when not mixed with other edible ingredient, the edible material as such can be used for producing tasty processed food such as bacon bits. Further, for example, by cutting into a size similar to that of fried chicken, the edible material as such, or after cooking, can be utilized as a side dish. That is, a cutting method can be selected depending on a desired size, and can be selected from a cutter which cuts a material finely immediately after an extruder outlet, a guillotine cutter which cuts a material at somewhere downstream from an outlet, a hammer mill, a turbo mill, a comitrol, a silent cutter, a batch wise cutter, etc., and a combination thereof. An extrudate itself may be cut immediately after discharge or some time after discharge; or an extrudate may be cut after subjecting it to physical or chemical treatment such as heating, cooling and freezing; or a dried extrudate may be cut. Further, a dried extrudate material may be reconstituted with a seasoning stock, a nutrient enhancing solution or water and then cut. Or an extrudate may be cut by a combination of these cutting methods. In general, after an extrudate is roughly cut with a rotary cutter immediately after an extruding machine outlet, a particle size is regulated with a comitrol, and then dried. When drying is desired, for example, a drum drying method, a fluidized bed drying method, a shell drying method, and a freezing drying method can be employed. In general, a fluidized bed drying method is employed.

Further, for example, when snacks are produced by using soybean protein, texture forming conditions can be experimentally determined. Since starch is blended at a large amount, the amount of water or steam to be added can be used in such a range that water contained in the mixture of ingredients including added water which is fed to an extruding machine is 5 to 30% by weight, preferably 7 to 20% by weight.

In addition, for example, when a fishery paste daily dish is produced using soybean protein, texture forming conditions can also be experimentally determined. Since a fish meat paste is blended at a large amount, the water content of the mixture of ingredients is high. Then, when a texture forming temperature is elevated as in the above textured protein, the mixture spouts from a discharge outlet and therefore certain treatment such as cooling of a die is required. For this reason, depending upon heating in a subsequent step, a texture forming temperature is preferably 70 to 120° C. as a tip barrel temperature. When the extrudate is sufficiently heated in a subsequent step, a texture forming temperature is preferably 0 to 70° C. as a tip barrel temperature.

EXAMPLES

The following Examples further illustrate the present invention in detail but are not to be construed to limit the scope of the present invention.

(Explanation of Raw Materials Used Hereinafter)

Defatted soybean powder: manufactured by Fuji Oil Co., Ltd. (components: protein 52%, moisture 6%, lipid 0.5%)

Isolated soy protein "FUJIPRO E": manufactured by Fuji Oil Co., Ltd. (components: protein 86%, moisture 6%, lipid 0.5%)

Corn starch: commercially available product (component: protein 0.3%, moisture 13%, lipid 0.7%)

Tomato powder: commercially available tomato was ground, and lyophilized.

Spinach powder: commercially available spinach was ground, and lyophilized.

Cabbage powder: commercially available cabbage was ground, and lyophilized.

Broccoli powder: commercially available broccoli was ground, and lyophilized.

Burdock powder: commercially available burdock was ground, and lyophilized.

Carrot powder: commercially available carrot was ground, and lyophilized.

Example 1

Screening of Various Vegetables

Soybean protein and each of various vegetable powders were formed into a textured product according to a conventional method using a twin-screw extruder under the following conditions using the formulation shown in Table 1-a.

Extruding machine: KEI-45-type twin-screw extruder manufactured by KOWA KOGYO CO., LTD., L/D25, screw diameter 45 mm Die: 5 mmφ×one hole face die, 1 and 5 mm Throughput: powder flow rate 30 kg/h, added water flow rate 9.6 to 13.2 kg/h Barrel temperature: No. 1 barrel 30° C., No. 2 barrel 80° C., No. 3 barrel 100° C., No. 4 barrel 120° C., No. 5 barrel 150° C.

Die tip temperature: 160° C.
Screw rotation number: 200 r.p.m.
Screw pattern: order of BBBBBTBK (⅓F·⅓R·⅓F) BTBPK (⅓F·⅓R·⅓F) from the extruder inlet (B is forward ball screw, T is forward trapezoid screw, P is forward pineapple screw, KF is forward kneading screw, KR is reverse kneading screw)

TABLE 1-a (formulation)

| Experiment No. | Defatted soybean powder | Vegetable | (Unit: part by weight) |
|---|---|---|---|
| Test 1-0 | 100 | — | |
| Test 1-T1 | 99 | Tomato powder 1 | |
| Test 1-T5 | 95 | Tomato powder 5 | |
| Test 1-H1 | 99 | Spinach powder 1 | |
| Test 1-H5 | 95 | Spinach powder 5 | |
| Test 1-K1 | 99 | Cabbage powder 1 | |
| Test 1-K5 | 95 | Cabbage powder 5 | |
| Test 1-B1 | 99 | Broccoli powder 1 | |
| Test 1-B5 | 95 | Broccoli powder 5 | |
| Test 1-G1 | 99 | Burdock powder 1 | |
| Test 1-G5 | 95 | Burdock powder 5 | |
| Test 1-N1 | 99 | Carrot powder 1 | |
| Test 1-N5 | 95 | Carrot powder 5 | |

The resulting extrudate was cut into about 1 cm long with a rotary cutter immediately after a die outlet, and dried with hot air at 90° C. in a drier manufactured by TABAI ESPEC CORP. so that the moisture content became 9% by weight. The textured product thus obtained was reconstituted with water at 80° C. for 10 minutes, and analyzed and evaluated. The results are shown in Table 1-b.

TABLE 1-b (evaluation results)

| Experiment No. | Soybean flavor | Vegetable flavor | Overall evaluation |
|---|---|---|---|
| Test 1-0 | 1 | 5 | X |
| Test 1-T1 | 1 | 3 | X |
| Test 1-T5 | 3 | 2 | X |
| Test 1-H1 | 1 | 4 | X |
| Test 1-H5 | 2 | 3 | X |
| Test 1-K1 | 3 | 4 | Δ |
| Test 1-K5 | 4 | 3 | Δ |
| Test 1-B1 | 2 | 3 | X |
| Test 1-B5 | 3 | 2 | X |
| Test 1-G1 | 1 | 2 | X |
| Test 1-G5 | 3 | 1 | X |
| Test 1-N1 | 1 | 3 | X |
| Test 1-N5 | 2 | 2 | X |

Score of "soybean flavor" was evaluated for the presence or the absence of a peculiar flavor derived from soybeans possessed by soybean protein by a sensory test according to the following criteria.
Score 5: No bean flavor
Score 4: Little bean flavor
Score 3: Slight bean flavor
Score 2: Mach bean flavor
Score 1: Strong bean flavor
Score of "vegetable flavor" was evaluated for the presence or the absence of a flavor of the added vegetable or root crop by a sensory test according to the following criteria.
Score 5: No flavor
Score 4: Little flavor
Score 3: Slight flavor
Score 2: Mach flavor
Score 1: Strong flavor
"x" to "◉" in "overall evaluation" were classified according to the following criteria: "x": Score of either of "soybean flavor" or "vegetable flavor" is 2 or less.
"○": Scores of both of "soybean flavor" and "vegetable flavor" are 4 or more.
(Only when both are 5, "◉")
"Δ": Other cases Example 2

Study on the Amount of Cabbage to be Added 1

Soybean protein and cabbage powder were formulated as shown in Table 2-a, and a textured product was obtained according to the same manner as that in Example 1. The resulting product was analyzed and evaluated. The results are shown in Table 2-b.

TABLE 2-a (formulation)

| Experiment No. | Defatted soybean powder | Cabbage powder |
|---|---|---|
| Test 2-0 | 100 | 0 |
| Test 2-K1 | 99 | 1 |
| Test 2-K3 | 97 | 3 |
| Test 2-K5 | 95 | 5 |
| Test 2-K10 | 90 | 10 |

(Unit: part by weight)

TABLE 2-b (evaluation results)

| Experiment No. | Soybean flavor | Vegetable flavor | Overall evaluation |
|---|---|---|---|
| Test 2-0 | 1 | 5 | X |
| Test 2-K1 | 3 | 4 | Δ |
| Test 2-K3 | 4 | 4 | ○ |
| Test 2-K5 | 4 | 3 | Δ |
| Test 2-K10 | 5 | 1 | X |

The score is the same as that in Table 1-b.

Example 3

Study on the Amount of Cabbage to be Added 2

Soybean protein and cabbage powder were formulated as shown in Table 3-a, and a textured product was obtained according to the same manner as in Example 1. The product was analyzed and evaluated. The results are shown in Table 3-b.

TABLE 3-a (formulation)

| Experiment No. | FUJIPRO E | Corn starch | Cabbage powder |
|---|---|---|---|
| Test 3-0 | 80 | 20 | 0 |
| Test 3-K01 | 79.9 | 20 | 0.1 |
| Test 3-K05 | 79.6 | 20 | 0.4 |

(Unit: part by weight)

TABLE 3-a-continued (formulation)

| Experiment No. | FUJIPRO E | Corn starch | Cabbage powder |
|---|---|---|---|
| | | | (Unit: part by weight) |
| Test 3-K1 | 79.2 | 20 | 0.8 |
| Test 3-K5 | 76 | 20 | 4 |

TABLE 3-b (evaluation results)

| Experiment No. | Soybean flavor | Vegetable flavor | Overall evaluation |
|---|---|---|---|
| Test 3-0 | 3 | 5 | Δ |
| Test 3-K01 | 4 | 5 | ○ |
| Test 3-K05 | 5 | 5 | ⊚ |
| Test 3-K1 | 5 | 4 | ○ |
| Test 3-K5 | 5 | 3 | Δ |

The score is the same as that in Table 1-b.

As described hereinabove, according to the present invention, it is possible to produced an extruded edible material with minimizing a peculiar flavor of soybean protein which is derived from its raw material, i.e., soybeans by mixing soybean protein, cabbage and water, and extruding the mixture under heating and pressure.

What is claimed is:

1. A process for producing an extruded edible material which comprises mixing soybean protein, cabbage and water, and extruding the mixture with heating at a tip barrel temperature of 120 to 200° C. under pressure to expand and texture the mixture.

2. The process according to claim 1, wherein the content of cabbage is 0.05 to 8 parts by weight (as dry solids) per 100 parts by weight of the soybean protein (as dry solids).

3. The process according to claim 2, wherein the soybean protein is isolated soy protein, and the content of cabbage is 0.05 to 3 parts by weight (as dry solids) per 100 parts by weight of the soybean protein (as dry solids).

4. The process according to claim 2, wherein the soybean protein is defatted soybeans, and the content of cabbage is 0.5 to 8 parts by weight (as dry solids) per 100 parts by weight of the soybean protein (as dry solids).

* * * * *